US006317129B2

(12) United States Patent
Tomita

(10) Patent No.: US 6,317,129 B2
(45) Date of Patent: Nov. 13, 2001

(54) DISPLAY DEVICE FOR SEWING MACHINE

(75) Inventor: Shintaro Tomita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/049,047

(22) Filed: Mar. 27, 1998

(30) Foreign Application Priority Data

Mar. 31, 1997 (JP) .................................................. 9-080753

(51) Int. Cl.[7] .................................................. G06T 11/00
(52) U.S. Cl. ........................ 345/467; 345/785; 112/102.5
(58) Field of Search ............................ 345/121, 123–125, 345/341, 467, 973; 112/102.5

(56) References Cited

U.S. PATENT DOCUMENTS 4,225,943 * 9/1980 Busch .................................. 364/900
4,519,008 * 5/1985 Takenouchi et al. .................. 360/79
5,619,636 * 4/1997 Sweat et al. ......................... 395/806
5,778,808 * 7/1998 Hirata ................................ 112/102.5
5,920,317 * 7/1999 McDonald ........................... 345/356
5,945,998 * 8/1999 Eick .................................... 345/431

FOREIGN PATENT DOCUMENTS 63-223864A * 9/1988 (JP) ............................... G06F/15/20

* cited by examiner

*Primary Examiner*—Mark Zimmerman
*Assistant Examiner*—Lance W. Sealey
(74) *Attorney, Agent, or Firm*—Oliff & Berridge PLC

(57) ABSTRACT

In a display device, a language switching key is operated so that a language in which a character string is displayed on an LCD is set. Upon operation of an information key, information in the set language is displayed on the LCD. When a character size is "16×16," the character string is displayed in one line on the screen of the LCD and the screen is scrolled horizontally. When the character size is "8×8," the character string is displayed in two lines on the screen of the LCD and the screen is scrolled vertically.

19 Claims, 11 Drawing Sheets

DISPLAY DEVICE FOR SEWING MACHINE

BACKGROUND OF THE INVENTION

1. Field of the Invention

This invention relates to a display device in which a screen of displaying means for displaying a character string is scrolled and the character string is displayed in a selected one of a plurality of languages.

2. Description of the Related Art

There have conventionally been provided household sewing machines including a display section on the front of a main body of the machine. The display section is disposed to be longer horizontally than vertically. The display section displays, in the form of characters or figures, information about the sewing, for example, forms of stitches or a type of presser foot suitable for the sewing operation. A small number of characters can be displayed on the horizontally elongated display section when a character string is displayed thereon. That is, since the character string cannot sometimes be displayed at once on one screen of the display section, the screen is scrolled in a predetermined direction so that all the characters of the character string are viewed.

The character string is displayed on the display section in a language a user of the sewing machine uses. The prior art has provided sewing machines in which the language of the character string can be switched from one to another so that the sewing machines are used by users of various languages.

On one hand, the English, French or German alphabet is composed of characters with relatively simple configurations. Accordingly, the character sizes can be reduced so that the character string is displayed in two or more lines on the display section. On the other hand, Chinese characters used in the Japanese and Chinese languages have relatively complicated configurations. Accordingly, the Chinese characters cannot be recognized when reduced in their sizes. As a result, since the sizes of the Chinese characters need to be increased so as to be clearly recognized, the Chinese characters are displayed in one line on the display section.

In a case where the character string is displayed on two or more lines on the display section, the character string can easily be read when the screen is vertically scrolled. In a case where the character string is displayed on a single line, the character string can easily be read when the screen is horizontally scrolled. Thus, the character string displayed on the screen of the display section is sometimes read with difficulty when the screen is scrolled in one direction in the above two cases. This poses a problem.

SUMMARY OF THE INVENTION

Therefore, an object of the present invention is to provide a display device in which the screen of the display means displaying the character string is scrolled and the character string can clearly be recognized regardless of the character size.

The present invention provides a display device comprising language setting means for setting one of a plurality of languages, display means for displaying a character string in the set language in one of a plurality of character sizes previously set according to the set language, and scroll means for automatically scrolling a display screen of the display means in one of a plurality of directions previously set according to the character size of the character string while the display means is displaying the character string.

The number of lines of the character string displayed by the display means differs depending upon the character size. The display screen of the display means is scrolled in the predetermined direction according to the character size of the character string in the above-described arrangement. Consequently, the character string displayed by the display means can easily be recognized.

In a preferred form, the display means is longer horizontally than vertically. The display means can be rendered small-sized although the number of characters displayed on the entire screen of the display means at one time is reduced. Since they write from left to right in most of countries, the number of characters in one line is not reduced even when the display means is horizontally longer. Consequently, the displayed contents can be prevented from being obscure.

The displayed contents are understood more easily when the screen of the display means is not scrolled than when the screen is scrolled. The displayed contents become difficult to understand particularly when the display means is small-sized so that the number of displayed characters is small. In view of this, the display means preferably displays the character string and a figure simultaneously.

In another preferred form, the display means displays information about sewing. The figure preferably shows a form of a stitch. Some users may have difficulty in understanding the forms of stitches only from the names, "stitch for overcasting," "stitch for applique," and "scallop stitch." In the preferred form, however, the form of stitch can easily be recognized.

In further another preferred form, the display means displays the character string in one or a plurality of lines according to the character size of the character string.

In further another preferred form, the scroll means scrolls the screen of the display means horizontally when the display means displays the character string in one line, and the scroll means scrolls the screen of the display means vertically when the display means displays the character string in a plurality of lines. Consequently, the character string displayed by the display means can further easily be understood.

In further another preferred form, the scroll means changes a scrolling time according to a direction in which the screen of the display means is scrolled. Consequently, the display screen can be scrolled for a period of time suitable for the size of characters of the displayed character string.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
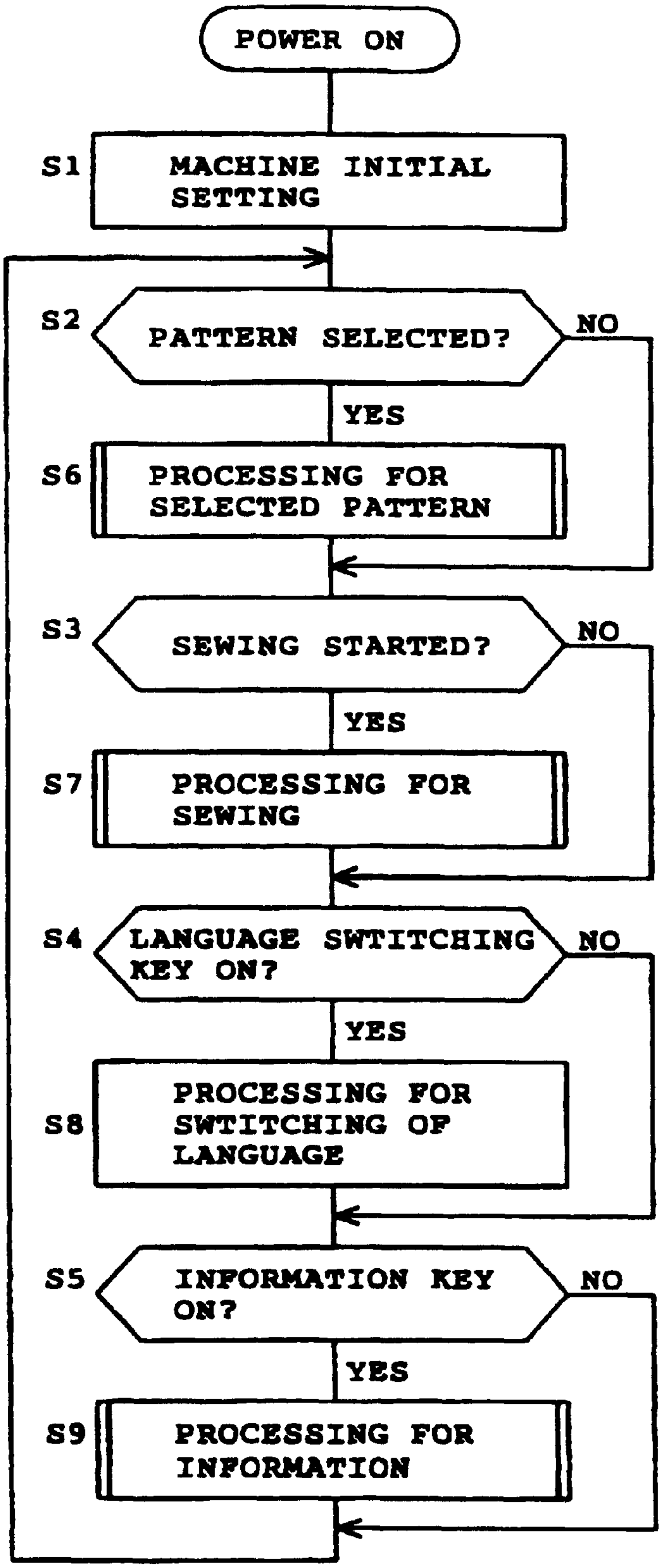
FIG. 1 is a flowchart showing control contents of the entire sewing operation executed by the sewing machine to which the display device of a first embodiment in accordance with the present invention is applied.

A first embodiment will be described with reference to FIGS. 1 to 11. The present invention is applied to an electronically controlled household sewing machine in the first embodiment. Referring first to FIG. 11, an overall sewing machine is schematically shown. The sewing machine comprises a main body 1 including a bed 2 and an arm 3 formed integrally with and extending over the bed 2. A sewing head 5 having a needle bar 7 with a sewing needle 7*a* is provided on a distal end of the arm 3. A presser bar 6 is also mounted on the distal end of the arm 3. A presser foot (not shown) is adapted to be attached to the presser bar 6 for applying a suitable force to a workpiece cloth (not shown) to bias a part of the workpiece cloth through which the needle 7*a* passes.

A throat plate (not shown) is mounted on an upper surface of the bed 2 so as to correspond to the needle bar 7. A shuttle mechanism (not shown) is provided at a position under the throat plate in the bed 2. A sewing machine motor 8 (shown only in FIG. 10) is provided in the main body 1. The needle bar 7, the shuttle mechanism, etc. are synchronously driven by the sewing machine motor 8 so that a sewing operation is executed.

An embroidering unit 11 is detachably attached to a left-hand end of the bed 2. The embroidering unit 11 comprises an embroidery frame 15 for holding the workpiece cloth and an embroidery frame moving mechanism 12 for moving the embroidery frame 9 horizontally, that is, in an X-axis direction and a Y-axis direction. The embroidery frame 15 includes an outer frame and an inner frame between which the workpiece cloth is sandwiched, so that the workpiece cloth can be held tightly stretched inside the embroidery frame 15 between the frame and the throat plate 2*a*.

The embroidery frame moving mechanism 12 comprises a movable member 13 moved by an X direction drive motor 16*a* (shown only in FIG. 10) freely in the X direction, that is, leftward and rightward as viewed in FIG. 11. The mechanism 12 further comprises a moving arm 14 provided on the movable member 13 to be moved by a Y-axis drive motor 16*b* (shown only in FIG. 10) freely in the Y direction, that is, frontward and backward as viewed in FIG. 11. The embroidery frame 15 is detachably attached to the moving arm 14. Consequently, the workpiece cloth held by the embroidery frame 15 can be moved by the embroidery frame moving mechanism 12 to an optional position based on an intrinsic X-Y coordinate system. An embroidering operation is performed when the needle bar 7, shuttle mechanism, presser foot, etc. are driven by the respective drive mechanisms while the workpiece cloth is moved freely relative to the needle bar 7 by the embroidery frame moving mechanism 12.

The sewing machine of the embodiment is capable of performing a variety of ordinary sewing modes such as straight stitching, zigzag stitching and overcast stitching as well as embroidering. In case that the embroidering is not carried out, the embroidering unit 11 is removed from the bed 2 to be replaced by a flat table (not shown) for the ordinary sewing modes. The workpiece cloth is moved frontward and backward by a feed dog (not shown) provided below the throat plate 4 while the sewing needle 7*a* assumes an upper position. A feed dog driving motor 9 (shown only in FIG. 10) is provided in the main body 1 for driving the feed dog. A needle bar rocking motor 10 is also provided in the main body 1 for rocking the needle bar 7 leftward and rightward. Consequently, a zigzag stitch etc. can be sewn.

A start/stop key 21 is provided on a front surface of the distal end of the head 5 as shown in FIG. 11. An operation panel 22 is provided on the front of the arm 3. The operation panel 22 is provided with a liquid crystal display (LCD) 17 serving as display means and sewing information displaying means. The LCD 17 is disposed to be longer horizontally than vertically. The operation panel 22 is further provided with operation keys including an ordinary sewing key 18*a*, an embroidering key 18*b*, a layout key 18*c*, a memory key 18*d*, a language switching key 18*e* serving as language setting means, an information key 18*f*, etc. A touch panel 23 (shown only in FIG. 10) is provided on the surface of the LCD 17. The touch panel 17 comprises a number of transparent electrodes arranged vertically and horizontally and detects where the user touches it, as well known in the art. The touch panel 23 is operated so that a desired embroidery pattern or a desired stitch form in the ordinary sewing is selected and so that an amount of needle rocking (rocking range), a length of stitch, thread tension, etc. can be adjusted. A card insertion slot (not shown) is provided in the right-hand side wall of the main body 1. An external ROM card 19 (shown only in FIG. 10) is inserted into the card insertion slot.

Figure 10:
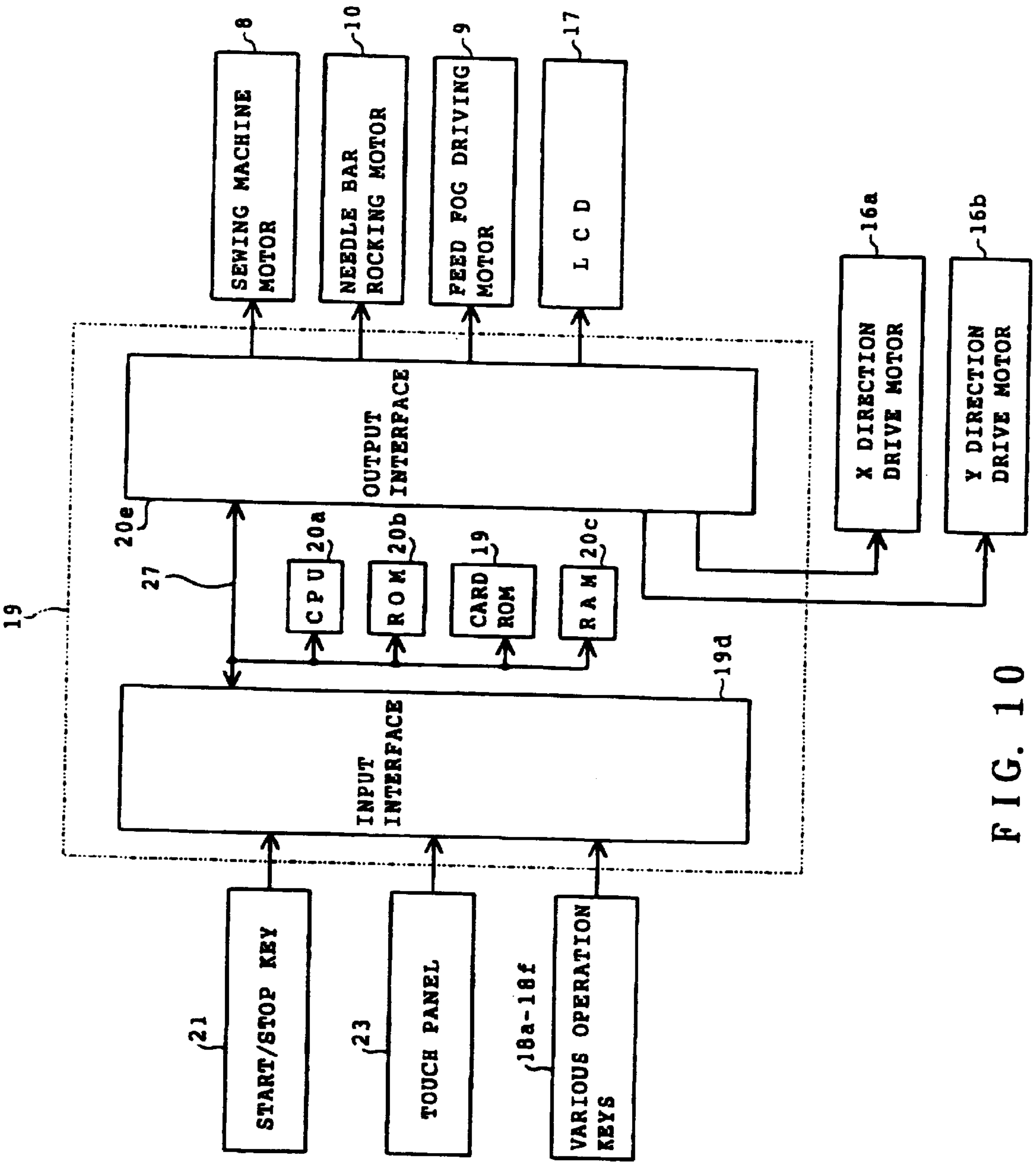
FIG. 10 is a block diagram showing the electrical arrangement of the sewing machine.
Figure 11:
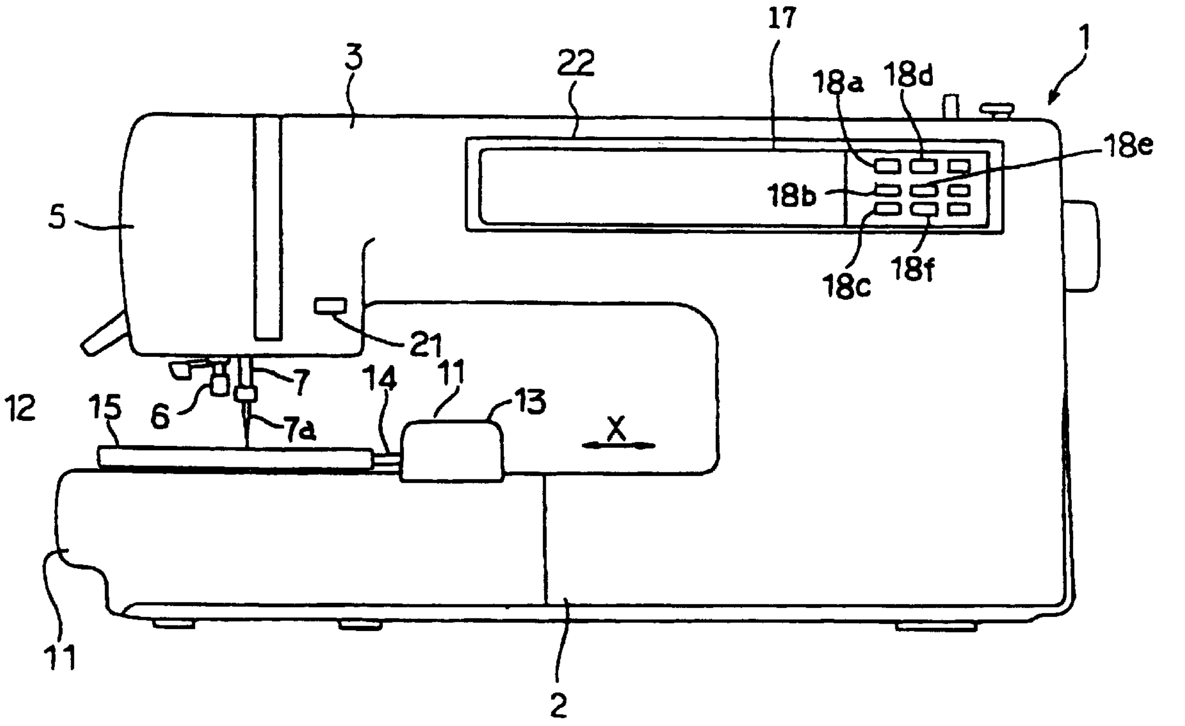
FIG. 11 is a front view of the sewing machine.

Referring to FIG. 10, a microcomputer-based control device 20 is provided in the machine main body 1 for controlling the various mechanisms described above. The control device 20 includes an input interface 20*d*, output interface 20*e*, CPU 20*a*, ROM 20*b*, and RAM 20*c* all connected by a bus 27. The control device 20 serves as scroll means as will be described later. The sewing machine motor 8, the needle bar rocking motor 10, the feed dog driving motor 9 and the LCD 7 are connected to the output interface 20*e*. The X and Y direction drive motors 16*a* and 16*b* of the embroidery frame moving mechanism 12 are further connected to the output interface 20*e* when the embroidering unit 11 has been attached to the bed 2. The start/stop key 21, the touch panel 23, and the operation keys 18*a* to 18*f* are connected to the input interface 20*d*. The external ROM card 19 is further connected to the input interface 20*d* when inserted in the card insertion slot.

The ROM 20*b* stores control programs for controlling the embroidering operation and other ordinary sewing operations of the embroidery machine, and a control program for controlling display of the LCD 17, a data processing program for performing various data processes such as readout and edit of embroidery data. The ROM 20*b* further stores pattern data of a number of patterns for the ordinary sewing, pattern numbers of the patterns, embroidery data of a number of embroidery patterns, and embroidery pattern numbers of the embroidery patterns. The external ROM card 19 stores embroidery data of a number of embroidery patterns and embroidery pattern numbers of the embroidery patterns. Each of the pattern data and embroidery data is composed of data indicating each needle location, that is, amounts of movement of the workpiece cloth in the X-axis and Y-axis directions for each stitch.

The operation of the sewing machine will be described with reference to FIGS. 1 to 9. Referring to FIG. 1, the control device 20 is initialized when the sewing machine connected to a power source. An initial screen is displayed by the LCD 17 (step S1). The straight stitch in the. ordinary sewing is set on the initial screen. The control device 20 executes the sewing operation (steps S2 to S7), a language switching process (steps S4 and S8), and information processing (steps S5 and S9) when the operation keys 18*a* to 18*f* and the touch panel 23 are operated.

Figure 8:
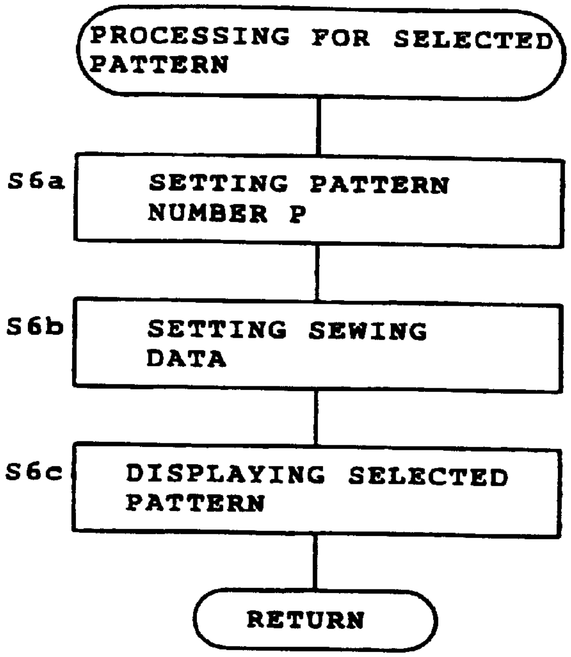
FIG. 8 is a flowchart showing processing for the selected pattern.

An embroidering operation of the sewing operation will first be described. A plurality of embroidery patterns (not shown) are displayed on a screen of the LCD 17 when the embroidering key 18*b* is operated. When the user operates the touch panel on the above-described screen to select a desired embroidery pattern (YES at step S2), the control device 20 advances to a subroutine for processing the selected pattern (step S6). The selected pattern processing is executed in a manner as shown in FIG. 8. A pattern number P of the selected embroidery pattern is written into the RAM 20*c* at step S6*a*. Embroidery data corresponding to the pattern number P is read from the ROM 20*b* at step S6*b*. The control device 20 sets sewing data on the basis of the read embroidery data, storing the sewing data in a predetermined storage area of the RAM 20*c*. An outline of the selected embroidery pattern is displayed on the screen of the LCD 17 at step S6*c*. When the start/stop key 21 is turned on in this state, the control device 20 completes the selected pattern processing, advancing to a subroutine for processing the sewing (YES at step S3; and step S7).

The LCD 17 is switched to a layout screen (not shown) when the layout key 18*c* is operated after selection of the embroidery pattern. The user operates the touch panel 23 on the layout screen to thereby change the direction and arrangement of the embroidery pattern. Furthermore, the sewing data written in the RAM 20*c* is corrected on the basis of operation of the touch panel 23. Additionally, the sewing data written in the RAM 20*c* is further written into the ROM 20*b* when the memory key 18*d* is operated.

Figure 9:
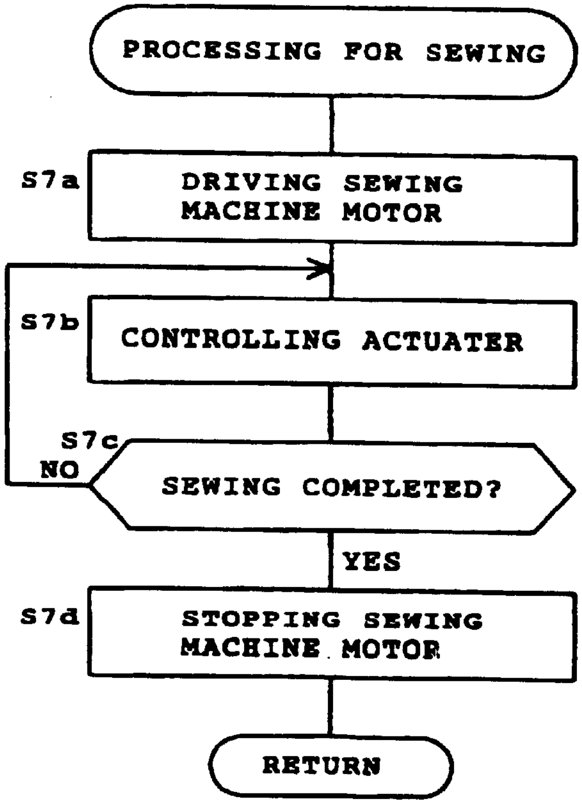
FIG. 9 is a flowchart showing processing for the sewing.

The sewing processing is shown in FIG. 9. First, the sewing machine motor 8 is driven at step S7*a*. The X and Y direction drive motors 16*a* and 16*b* are then driven at step S7*b*. Consequently, the embroidery frame 15 is moved a predetermined amount for every one stitch so that the embroidery pattern is formed on the workpiece cloth. Upon detection of stop data included in the sewing data (YES at step S7*c*), the control device 20 stops the sewing machine motor 8 to complete the embroidering operation (step S7*d*).

The sewing data stored in the ROM 20*b* or external ROM card 19 includes those of embroidery patterns of characters in animations, television programs, movies, etc. These embroidery patterns will be referred to as “character patterns.” The character patterns are usually protected by the copyrights. Accordingly, using the sewing data of the character patterns for business or commercial purposes without permission by the copyright owners constitutes an unfair conduct. The number of use of the sewing data of each character pattern is excessively increased when the data is used for the business or commercial purposes. In the embodiment, accordingly, the number of times of selection of each character pattern is counted by the control device 20 and data of an obtained count (accumulated value) is stored. The accumulated value is compared with a reference value. When the accumulated value is larger than the reference value, a message denoting that the sewing data of the selected embroidery pattern is invalid is displayed on the screen of the LCD 17 and execution of the embroidering operation is prohibited. Thus, an unfair use of the sewing data of character patterns can be prevented.

The table is attached to the sewing bed 2, instead of the embroidering unit 11 when the ordinary sewing is to be executed. Upon operation of the ordinary sewing key 18*a*, a plurality of stitch forms (not shown) for the ordinary sewing are displayed on the screen of the LCD 17. In this state, when the user operates the touch panel 23 to select a desired stitch form (YES at step S2), the control device 20 advances to a subroutine for processing the selected stitch form at step S6. In the initial state, the straight stitch is set. Accordingly, when the straight stitch is to be selected, the control device 20 advances to step S6 without execution of the above-described operation.

The selected pattern processing is executed in a manner as shown in FIG. 8. First, the pattern number P of the selected stitch form is written into the RAM 20*c* at step S6*a*. Pattern data corresponding to the pattern number P is read from the ROM 20*b* at step S6*b*. The control device 20 sets sewing data on the basis of the read pattern data, and the sewing data is written into a predetermined storage area of the RAM 20*c*. Thereafter, the control device 20 advances to step S6*c* to display the selected stitch form on the LCD 17. In this case, the stitch length, rocking range, and thread tension can also be set.

When the start/stop key 21 is turned on in this state, the control device 20 completes the selected pattern processing, advancing to a subroutine for processing the sewing (YES at step S3; and step S7). In the subroutine for the sewing processing, the machine motor 8 is driven and the feed dog driving motor 9 and the needle bar rocking motor 10 are driven on the basis of the sewing data written in the RAM 20*c* (steps S7*a* and S7*b*). Furthermore, the sewing machine motor 8 and other motors are stopped (step S7*d*) when the start/stop key 21 is operated (YES at step S7*c*). The ordinary sewing is thus completed.

Figure 7:
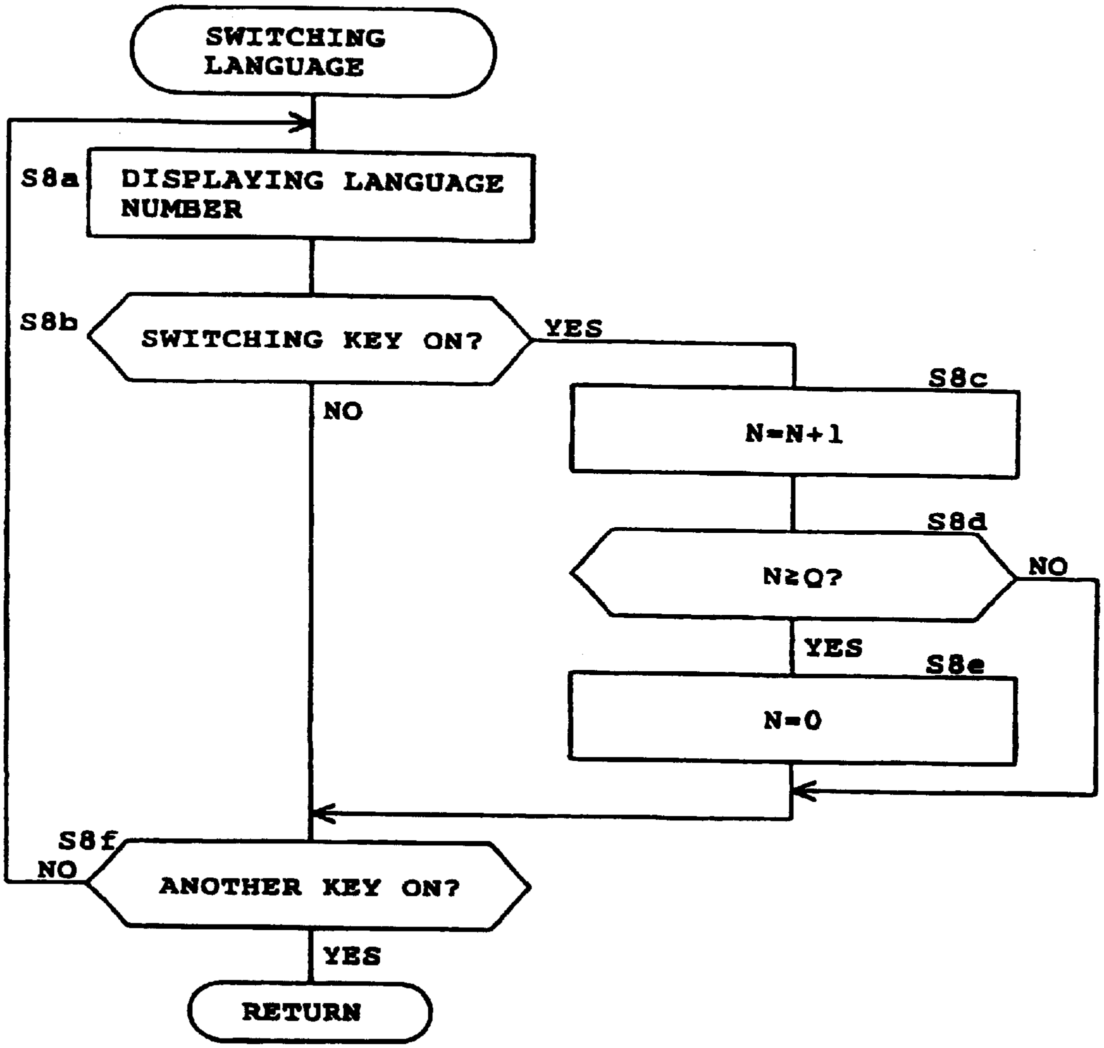
FIG. 7 is a flowchart showing a language switching process.

The language switching process will now be described. When the language switching key 18*e* is turned on at step S4 in FIG. 1 (YES.), the control device 20 advances to a subroutine for a language switching process at step S8. The process is executed in a manner as shown in FIG. 7. First, a language number N indicative of the currently set language is displayed an the screen of the LCD 17. The language numbers N are set so as to correspond to a plurality of languages, for example, 0: English, 1: Japanese, 2: German, . . . A character string is displayed in one of these languages on the screen of the LCD 17 in the embodiment as will be described later. Reference symbol Q designates a total number of languages.

When the language key 18*e* is operated again in the above-described state, the control device 20 advances to step S8*c* so that the language number N is counted up by The control device 20 then advances to step S8*d* to judge whether the language number N has reached Q. The control device 20 advances to step S8*f* when N is smaller than Q (NO at step S8*d*). When the language number N has reached Q (YES at step S8*d*), the control device 20 returns the language number N to 0 (step S8*e*), then advancing to step S8*f*. The control device 20 judges at step S8*f* whether the operation keys 18*a* to 18*d* and 18*f* other than the language switching key 18*e* have been operated. When none of these keys are operated (NO at step S8*f*), the control device 20 advances to step S8*a* where a newly set language number N is displayed on the screen of the LCD 17. Furthermore, data of the language number N and a character size of the language is written into the ROM 20*b*. The character size is set at "16×16" in each of languages in which the Chinese characters are used, for example, Chinese, Japanese, Korean, etc. On the other hand, the character size is set at "8×8" in each of languages in which alphabet is used, for example, English, German, French, etc. When a desired language number N is displayed on the screen of the LCD 17 by one time of operation of the language switching key 18*e*, the above-described operation is repeated until the desired language number is displayed. One or more of the operation keys 18*a* to 18*d* and 18*f* are operated at step S8*f* when the language number N corresponding to the desired language is displayed on the screen of the LCD 17, whereupon the language switching process is completed.

Figure 2:
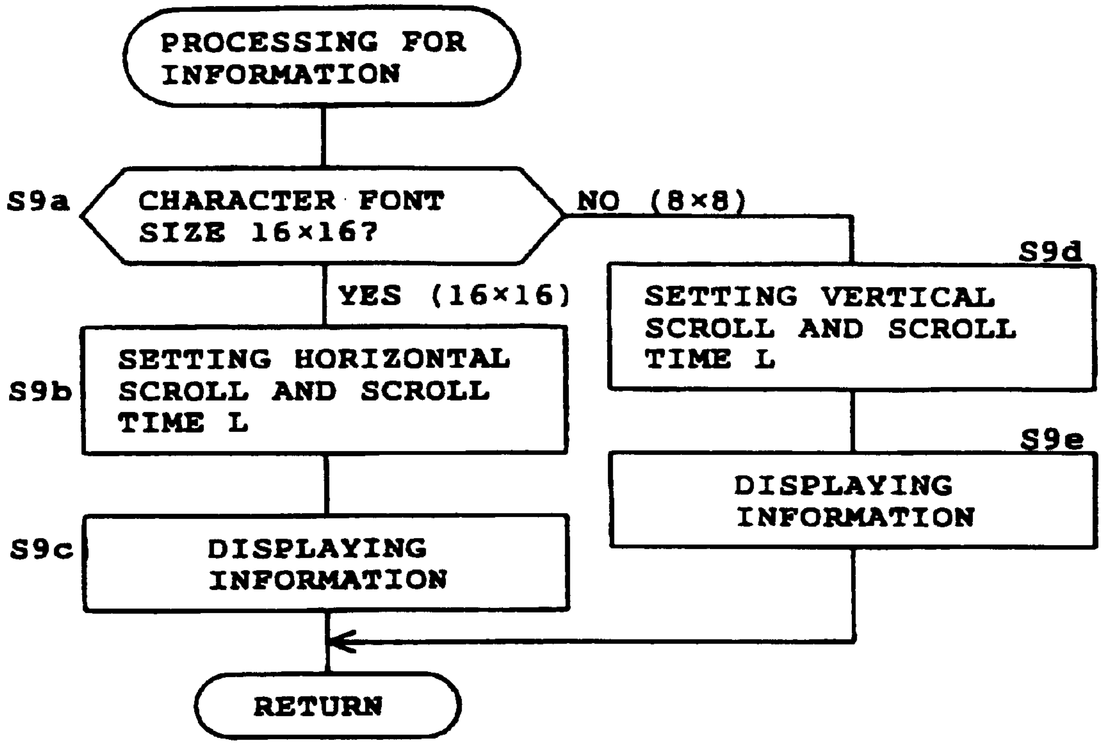
FIG. 2 is a flowchart showing an information processing.

The information displaying process will be described. When the information key 18*f* is turned on at step S5 in FIG. 1 (YES), the control device 20 advances to a subroutine for information displaying process at step S9. The information displaying process is executed in a manner as shown in FIG. 2. The data of the language number N and the character size is read from the ROM 20*b*. At step S9*a*, furthermore, the control device 20 judges whether the character size is "16×16." The control device 20 judges in the affirmative at step S9*a* when a language using the Chinese characters such as Chinese, Japanese or Korean, is set. At step S9*b*, a horizontal scrolling is set and a scrolling time is set at a time L. The scrolling time is a period of time required for a character on display to be moved by a predetermined distance (scrolling speed) when the screen of the display means is scrolled. Information is then displayed in the set language on the screen of the LCD 17 at step S9*c*.

Figure 3:
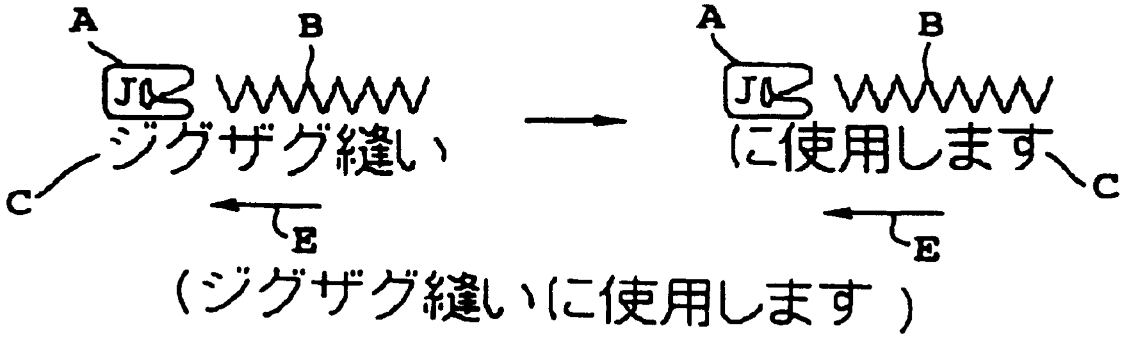
FIG. 3 shows an example of sewing information displayed on the liquid crystal display (LCD) when the screen thereof is scrolled horizontally.

FIG. 3 illustrates an example of information displayed in Japanese on the screen of the LCD 17. An upper part of the screen displays a figure A specifying the type of presser foot suitable for the sewing and a figure B specifying the type of stitch. On a lower part of the screen, a character string C is displayed in Japanese in one line, being scrolled for the time L. More specifically, the character string C of "ジグザグ縫い" is first displayed on the screen of the LCD 17. This character string C is scrolled for the time L horizontally or in the direction of arrow E in FIG. 3 so that an entire information, "ジグザグ縫いに使用します", is finally displayed. The information corresponds to an English expression, "The stitch is used for zigzag stitch."

Figure 4:
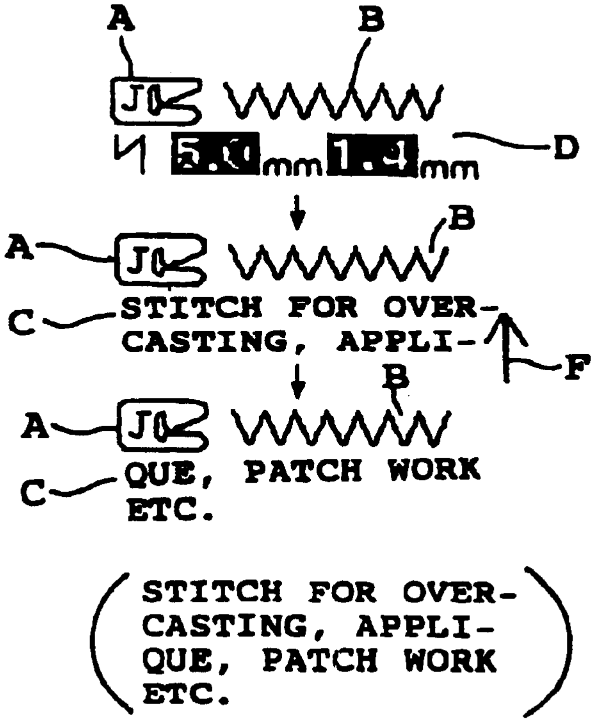
FIG. 4 shows an example of sewing information displayed on the LCD when the screen thereof is scrolled vertically.
Figure 5:
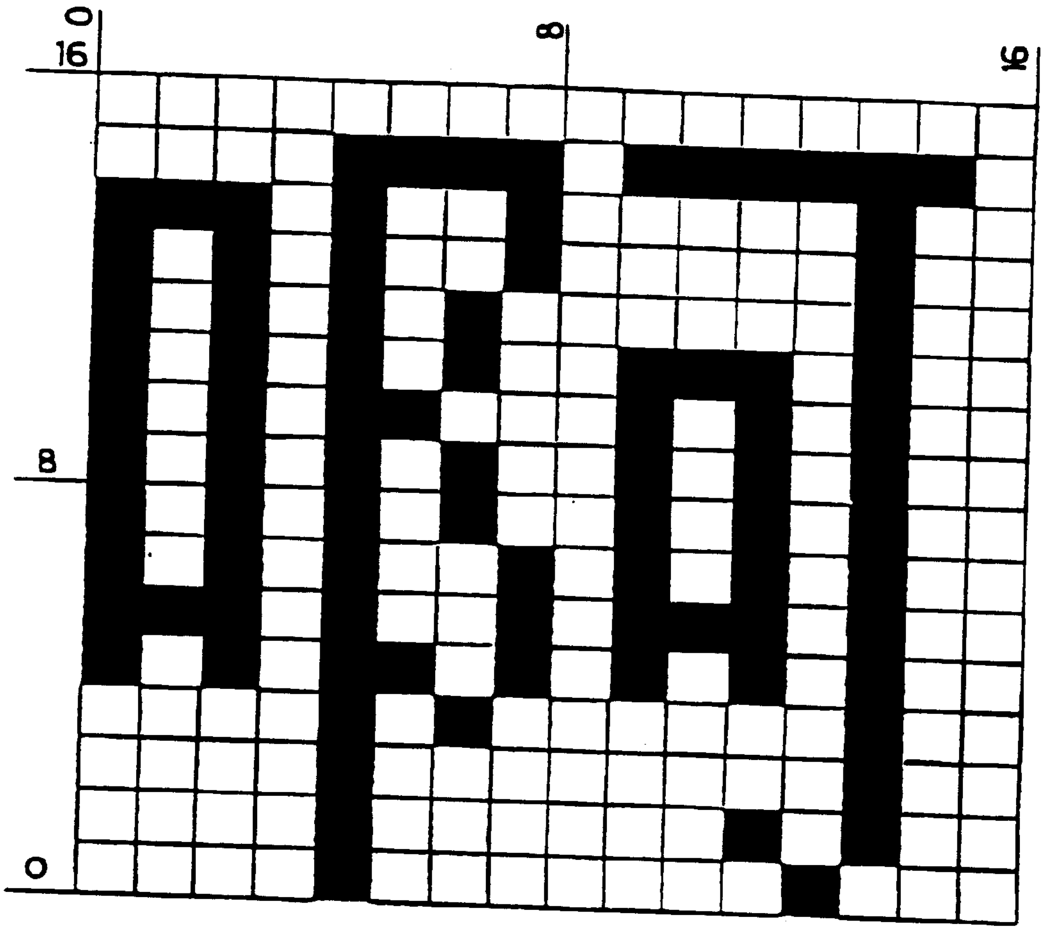
FIG. 5 is a view for explaining the size of a Chinese character.
Figure 6:
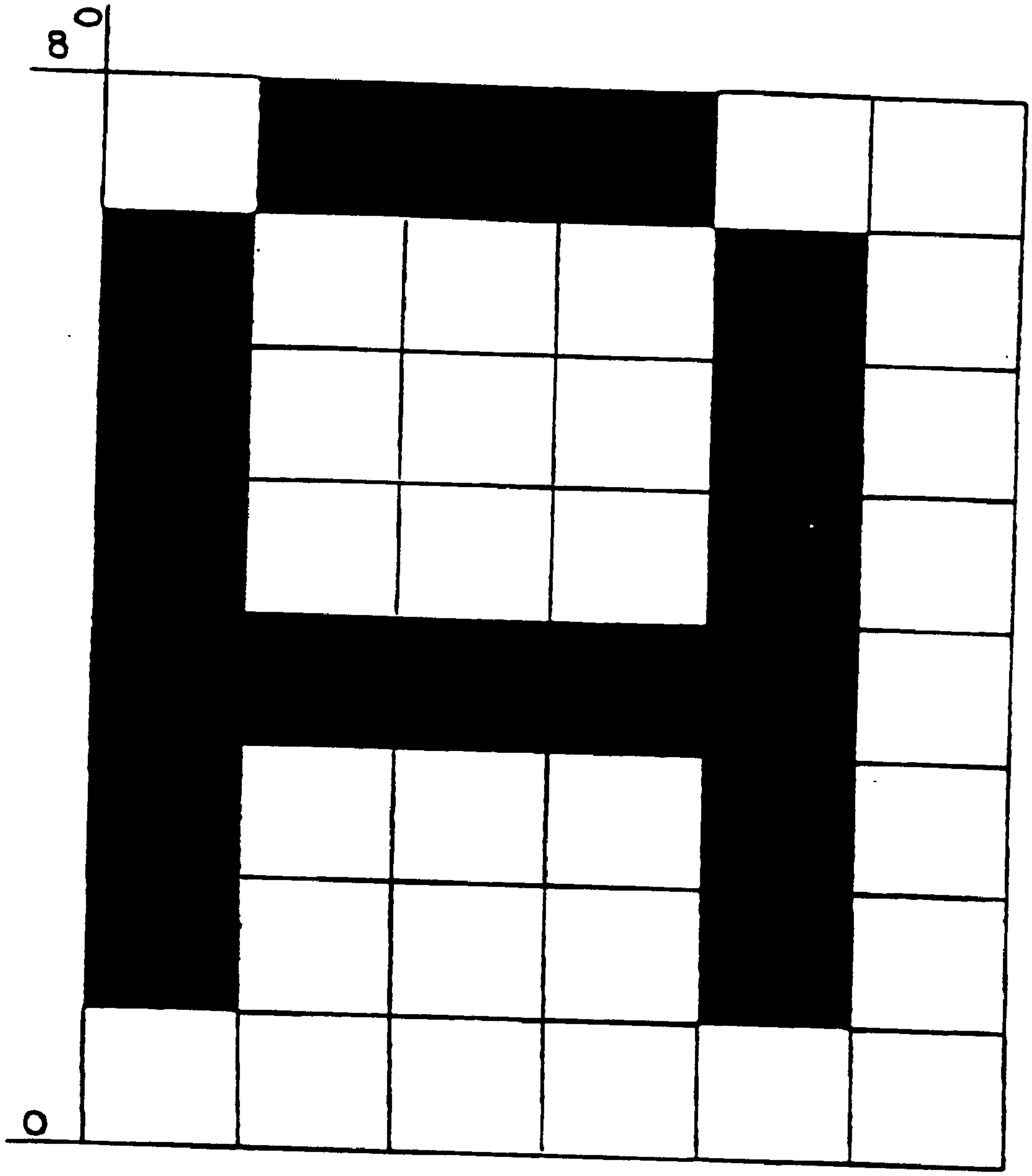
FIG. 6 is a view for explaining the size of an alphabetic character.

On the other hand, since the character size is "8×8" when one of English, German or French is set, the control device 20 judges in the negative at step S9*a*. At step S9*d*, a vertical scrolling is set and the scrolling time is set at time S at step S9*d*. The time S is set to be shorter than the above-mentioned time L. The information is then displayed in the set language on the screen of the LCD 17. FIG. 4 illustrates an example of information displayed in English on the screen of the LCD 17. The upper part of the screen displays a figure A specifying the type of presser foot suitable for the sewing and a figure B specifying the type of stitch. On a lower part of the screen, a character string D is first displayed in English. Thereafter, the screen of the LCD 17 is scrolled so that the character string C is displayed in a plurality of lines, for example, on two lines, being scrolled vertically or in the direction of arrow F in FIG. 4 for the time S. More specifically, the character string C of "Stitch for overcasting, appli-" is first displayed on the screen of the LCD 17. This character string C is scrolled for the time S vertically so that an entire information, "Stitch for overcasting, applique, patchwork etc." is finally displayed.

According to the above-described embodiment, the character string C is displayed in the set language on the screen of the LCD 17 when the information key 18*f* is operated. In this case, when the character size of the character string C is large, the character string C is displayed in one line on the screen of the LCD 17 and the screen is scrolled horizontally. On the other hand, when the character size of the character string C is small, the character string C is displayed in two lines on the screen of the LCD 17 and the screen is scrolled vertically. Consequently, the character string C can clearly be read regardless of the character size thereof.

The scrolling time is longer when the screen is scrolled horizontally than when the screen is scrolled vertically. That is, the screen is scrolled slowly when the displayed character string C includes characters such as the Chinese characters which are sometimes difficult to read. Consequently, the character string C can easily be read.

In the foregoing embodiment, the display device of the invention is applied to the LCD 17 which serves as the display means in the sewing machine and is longer horizontally than vertically. As a result, the size of the LCD 17 can be reduced and accordingly, the cost of the sewing machine can be reduced. The display means can be rendered smaller in size even when it is longer vertically than horizontally. However, the number of characters displayed in one line is reduced, which results in difficulty in reading the displayed character string. In the foregoing embodiment, however, the LCD 17 is longer horizontally than vertically. Consequently, the number of characters displayed in one line is increased. Furthermore, the information can easily be understood even when the screen displaying the character string C is scrolled.

The contents of the information cannot sometimes be understood better when the character string C displayed on the screen of the LCD 17 is scrolled than when the entire information is displayed on the screen at one time. In the foregoing embodiment, however, the information displayed on the screen of the LCD 17 is composed of the figures A and B as well as the character string C. The contents of information can be understood better as compared with the case where only the character string is displayed on the screen of the LCD 17. Furthermore, some users may have difficulty in understanding the forms of stitches only from the displayed names, for example, "stitch for overcasting," "stitch for applique," and "scallop stitch." In the foregoing embodiment, however, the figures A and B each showing the stitch form are displayed together with the character string C. Consequently, the user can easily recognize the stitch form from the displayed figure B.

In the foregoing embodiment, the language number N is counted up every time the language switching key 18*e* is operated. However, the number N may be counted down every time the key 18*e* is operated, instead. Alternatively, an up-key and a down-key may be provided for the purpose of the language switching.

Figure 12:
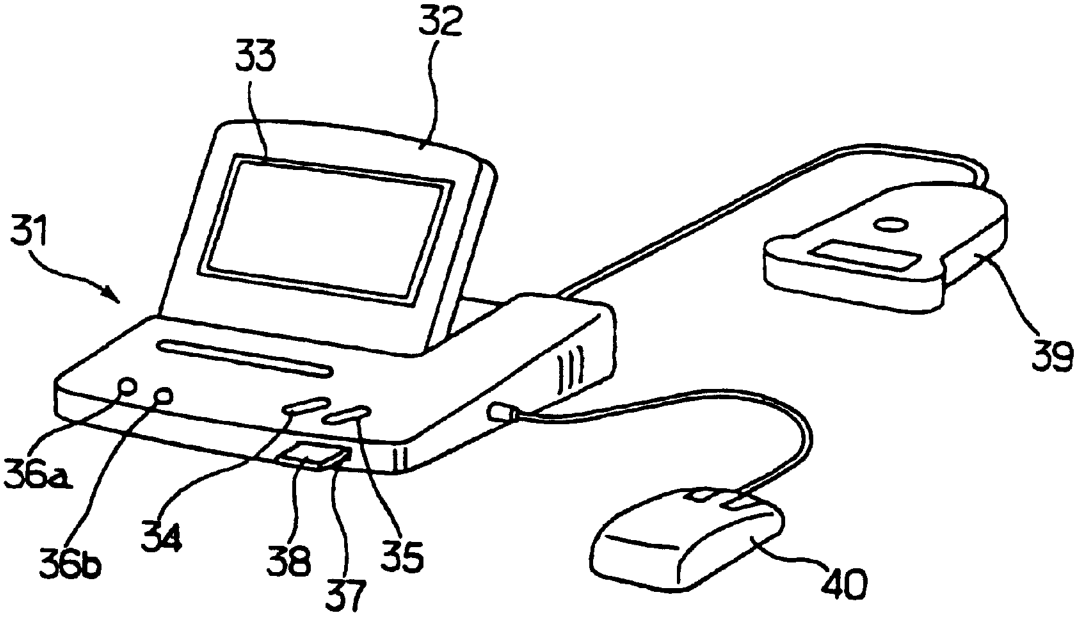
FIG. 12 is a perspective view of an embroidery data originator to which the display device of a second embodiment in accordance with the invention is applied.

FIG. 12 illustrates a second embodiment of the invention. The display device of the invention is applied to a embroidery data originator in the second embodiment. The differences between the first and second embodiments will be described.

A display section 32 is provided on the top of a main body 31 of the embroidery data originator. The display section 32 includes an LCD 33 serving as display means. A language switching key 34, an information key 35 and operation keys 36*a* and 36*b* for origination of the embroidery data are also provided on the top of the main body 31. A front side of the main body 31 has a card insertion slot 37 into which a memory card 38 comprising a non-volatile memory such as flush memory is inserted. An image scanner 39 and a mouse 40 are connected to the main body 31. A microcomputer-based control device is provided in the main body 31 for controlling various mechanisms of the embroidery data originator.

The embroidery data originator originates embroidery data on the basis of image data read by the image scanner 39. The originated embroidery data is stored in the memory card 38. The LCD 33 displays both an embroidery pattern on the basis of the image data read by the image scanner 39 and information concerning the embroidery data originating process.

The language in which the characters are displayed on the LCD 33 can be switched by the language switching key 34 in the same manner as in the first embodiment. Furthermore, various pieces of information are displayed on the LCD by the information key 35. The character string C displayed on the screen of the LCD 33 is scrolled horizontally for the time L when the character size of the set language is large. On the other hand, the screen displaying the character string C is scrolled vertically for the time S when the character size of the set language is small. Accordingly, the same effect can be achieved in the second embodiment as in the first embodiment.

In the first embodiment, the data of the language number N and the character size of the language is stored in the ROM 20*c* when the language has been set by the language switching key 18*e*. The direction of the scrolling is set on the basis of the character size whose data is stored in the ROM 20*c*. However, the data of the language number N and an attribute indicative of the direction of the scrolling may be stored in the ROM 20*c*, instead.

Figure 13:
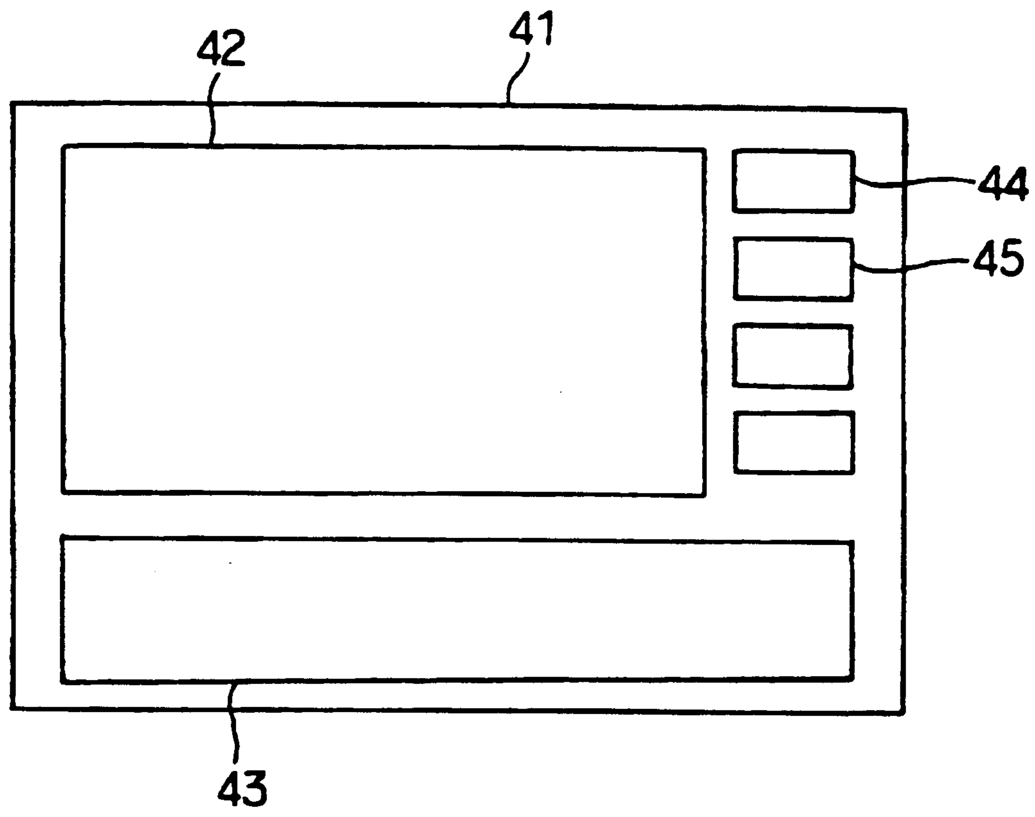
FIG. 13 is a front view of an operation panel to which the display device of a third embodiment in accordance with the invention is applied.

In the first embodiment, a single LCD 17 is provided in the operation panel 22. The embroidery patterns, the stitch forms and information are displayed on the LCD 17. However, the operation panel 41 may be provided with an LCD 42 for displaying the embroidery patterns and the stitch forms, and another LCD 43 which is longer horizontally than vertically and displays the information, as shown as a third embodiment in FIG. 13. The language switching key 44, the information key 45, etc. are provided on the right of the LCD 42. The touch panel is provided on the surface of the LCD 42.

Although the display device of the invention is applied to the sewing machine and the embroidery data originator in the foregoing embodiments, the display device may be applied to other machines and devices.

In the foregoing embodiments, the scrolling time is rendered longer when the character size is large, whereas the scrolling time is rendered shorter when the character size is small. On the other hand, when the character size is large, the number of characters displayed on a single screen is small and accordingly, the character string can be read in a short period of time. As a result, the scrolling time may be rendered shorter when the character size is large. When the character size is small, the number of characters displayed on a single screen is large and accordingly, a long period of time is required for the user to read the character string. AS a result, the scrolling time may be rendered longer when the character size is small. Furthermore, the scrolling time may be set at any desired value.

In the foregoing embodiments, the language switching keys 18*e*, 34 and 44 are provided so that the user operates the key to set the language. However, the language may be set by a service personnel at a store or shop, instead. Furthermore, the language may be set during the manufacture of the display device or at the time of shipment.

Three types of characters are used in the Japanese, that is, the Chinese characters, the Japanese "hiragana" or cursive "kana" characters, and the Japanese "katakana" or the square form of "kana." In view of these circumstances, the type of the character may be settable in the above-described display device. Furthermore, the character size may also be settable.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A display device for a sewing machine comprising:

a guidance producing unit that produces guidance pertaining to the sewing machine;

a language setting unit that sets one of a plurality of languages;

a display unit that displays a character string indicative of the guidance in the set language in one of a plurality of character sizes previously set according to the set language in at least one line determined according to the set character size; and a scroll unit that automatically scrolls a display screen of the display unit horizontally when the display unit displays the character string in one line and vertically when the display unit displays the character string in a plurality of lines.

2. A display device according to claim 1, wherein the sewing machine includes an operation panel provided thereon and the operation panel includes the display unit.

3. A display device according to claim 2, wherein the operation panel is provided on a front side of the sewing machine.

4. A display device according to claim 2, wherein the display screen is longer horizontally than vertically.

5. A display device according to claim 3, wherein the display unit displays the character string and a figure simultaneously.

6. A display device according to claim 5, wherein the figure shows a form of a stitch.

7. A display device according to claim 2, wherein the guidance includes operational information for the sewing machine.

8. A display device according to claim 4, wherein the guidance includes operational information for the sewing machine.

9. A display device according to claim 2, wherein the scroll unit changes a scrolling time according to a direction in which the display screen of the display unit is scrolled.

10. A display device according to claim 7, wherein the scroll unit changes a scrolling time according to a direction in which the display screen of the display unit is scrolled.

11. A display device for a sewing machine comprising:

a guidance producing circuit for producing guidance pertaining to the sewing machine;

a language setting circuit for setting one of a plurality of languages;

a display section for displaying a character string indicative of the guidance in the set language in one of a plurality of character sizes previously set according to the set language in at least one line determined according to the set character size; and a scroll circuit for automatically scrolling a display screen of the display section horizontally when the display section displays the character string in one line and vertically when the display section displays the character string in a plurality of lines.

12. A storage medium for storing a control program for operating a display device provided on a sewing machine, the control program accomplishing the functions of:

guidance producing means for producing guidance pertaining to the sewing machine;

display control means for controlling the display device so that the display device displays a character string indicative the guidance in the set language in one of a plurality of character sizes previously set according to the set language in at least one line determined according to the set character size; and scroll means for automatically scrolling a display screen of the display device horizontally when the display device displays the character string in one line and vertically when the display device displays the character string in a plurality of lines.

13. A storage medium according to claim 12, wherein the sewing machine includes an operation panel provided on a front side of the sewing machine and the operation panel includes the display device.

14. A storage medium according to claim 12, wherein the display screen is longer horizontally than vertically.

15. A storage medium according to claim 12, wherein the guidance includes operational information for the sewing machine.

16. A storage medium according to claim 12, wherein the scroll unit changes a scrolling time according to a direction in which the display screen of the display unit is scrolled.

17. A display device for a sewing machine comprising:

a guidance producing unit that produces guidance pertaining to the sewing machine;

a language setting unit that sets one of a plurality of languages;

a display unit that displays a character string indicative of the guidance in the set language in one of a plurality of character sizes previously set according to a type of the character in at least one line determined according to the set character size; and a scroll unit that automatically scrolls a display screen of the display unit horizontally when the display unit displays the character string in one line and vertically when the display unit displays the character string in a plurality of lines.

18. A display device according to claim 17, wherein the character size of the languages differ from one another.

19. A display device for a sewing machine comprising:

a guidance producing unit that produces guidance pertaining to the sewing machine;

a language setting unit that sets one of a plurality of languages;

a display unit that displays a character string indicative of the guidance in the set language in one of at least two different character sizes previously set according to the set language in at least one line determined according to the set character size; and a scroll unit that automatically scrolls a display screen of the display unit horizontally when the display unit displays the character string in one line and vertically when the display unit displays the character string in a plurality of lines.

* * * * *